United States Patent [19]

Fischer

[11] 4,214,416
[45] Jul. 29, 1980

[54] ARRANGEMENT FOR ANCHORING A MOUNTING ELEMENT IN A HOLE OF A SUPPORTING STRUCTURE

[76] Inventor: Artur Fischer, Weinhalde 34, D-7244 Waldachtal 3,(Tumlingen), Fed. Rep. of Germany

[21] Appl. No.: 934,550

[22] Filed: Aug. 17, 1978

[30] Foreign Application Priority Data

Sep. 27, 1977 [DE] Fed. Rep. of Germany ....... 2743301
Nov. 24, 1977 [DE] Fed. Rep. of Germany ....... 2752461

[51] Int. Cl.² .............................................. E04B 1/38
[52] U.S. Cl. .......................................... 52/704; 52/744
[58] Field of Search .................... 52/704, 744; 405/260

[56] References Cited

U.S. PATENT DOCUMENTS

| | | | |
|---|---|---|---|
| 3,212,269 | 10/1965 | Olsen | 52/744 X |
| 3,532,316 | 10/1970 | Mathes | 52/744 X |
| 4,028,857 | 6/1977 | Fischer | 52/704 X |
| 4,044,512 | 8/1977 | Fischer et al. | 52/704 X |
| 4,063,582 | 12/1977 | Fischer | 52/704 X |
| 4,114,329 | 9/1978 | Fischer et al. | 52/704 X |
| 4,120,128 | 10/1978 | Pauls | 52/704 X |

Primary Examiner—James A. Leppink
Assistant Examiner—Carl D. Friedman
Attorney, Agent, or Firm—Michael J. Striker

[57] ABSTRACT

An arrangement for anchoring a mounting element in a hole of a supporting structure by a hardenable material which is supplied into the hole from an outlet end of an injecting device, has an insert element which is located in an inlet opening formed between an inner portion of the mounting element and a wall of the supporting structure. The insert element is provided with a filling opening communicating with the hole of the supporting structure. The arrangement includes a mouthpiece element arranged on the filling opening of the insert element and provided with a setting recess which is located at an acute angle to an axis of the hole of the supporting structure and communicates with the filling opening of the insert element. The setting recess is arranged for receiving the outlet end of the injecting device.

20 Claims, 4 Drawing Figures

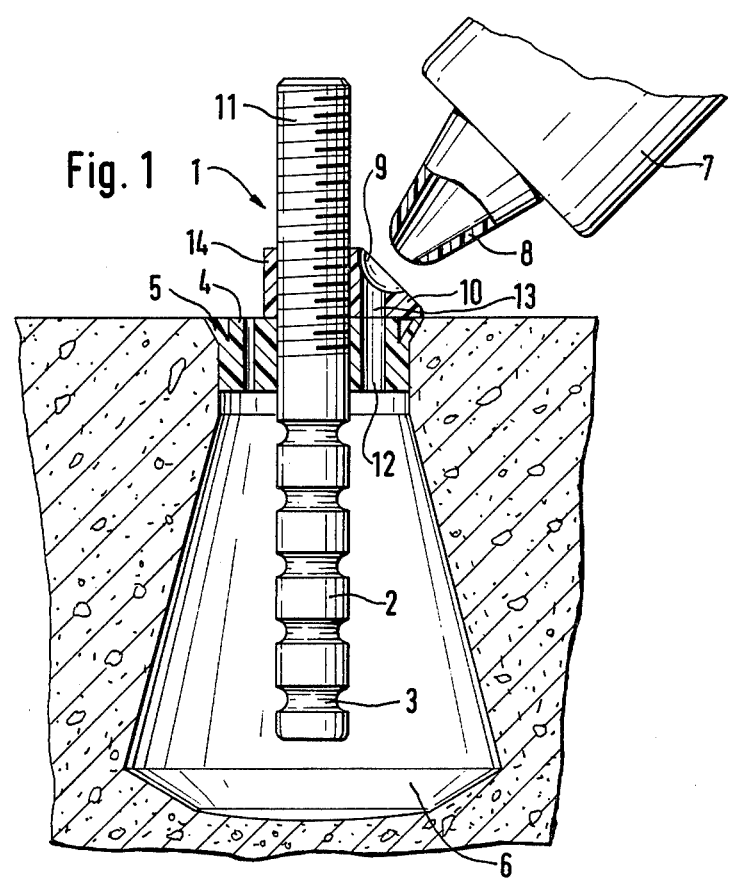
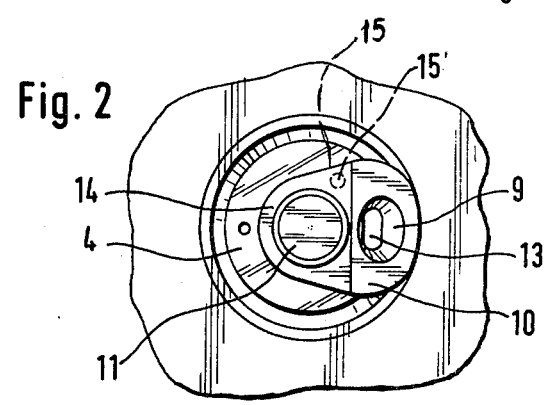

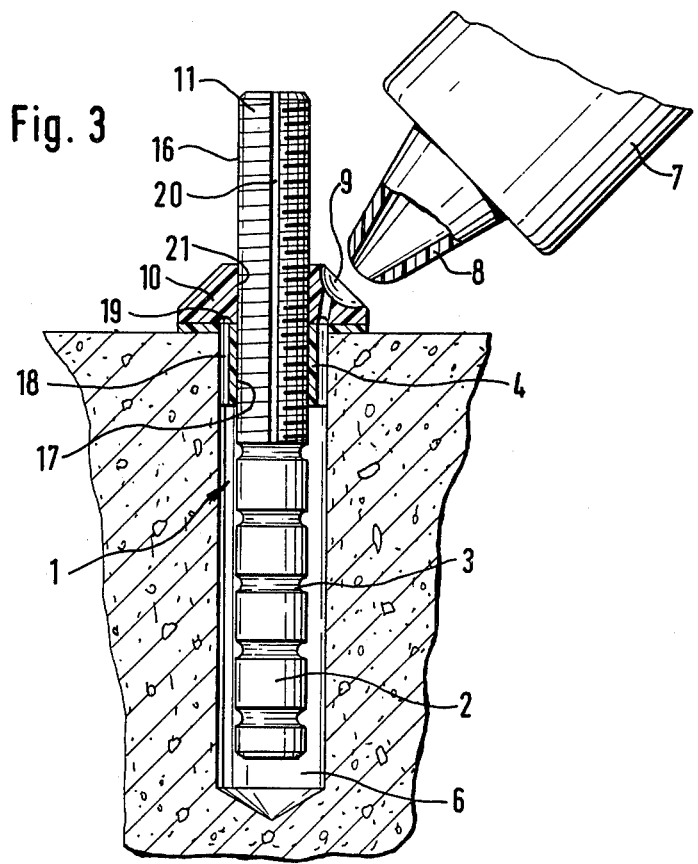
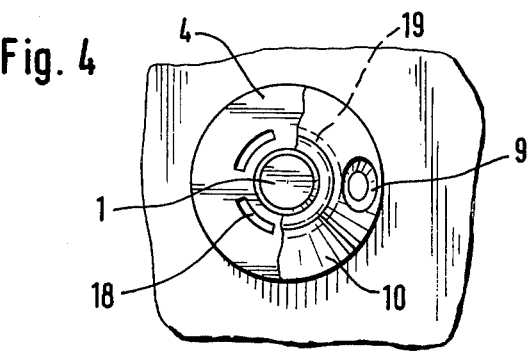

4,214,416

ARRANGEMENT FOR ANCHORING A MOUNTING ELEMENT IN A HOLE OF A SUPPORTING STRUCTURE

BACKGROUND OF THE INVENTION

The present invention relates to an arrangement for anchoring a mounting element in a hole of a supporting structure by a hardenable binding material which is supplied into the hole from an outlet end of an injecting device.

Arrangements of the above-mentioned known type have been proposed in the art. A mounting element which is to be anchored in a hole of a supporting structure has an outer portion which projects outwardly beyond a face of the supporting structure to mount an object to the latter, and an inner portion located in the hole of the supporting structure to be anchored therein. A known anchoring arrangement includes an annular insert which is located in an annular opening forming between the outer surface of the inner portion of the mounting element and the inner surface of the wall of the supporting structure. The insert element is provided with a filling opening through which a hardenable binding material is poured into the hole of the supporting structure.

In order to anchor the mounting element in the hole of the supporting structure, an inlet opening having a diameter corresponding to that of the insert element is drilled in the supporting structure, and thereupon the mounting element together with the insert element fitted thereon is pressed into the thus-drilled inlet opening. Thereby, the inlet opening between the mounting element and the wall of the supporting structure is closed by the insert element. Simultaneously, the mounting element is centered in the hole and fixed in its position by means of the insert element.

When the mounting element and therefore the insert element have small dimensions, the distance between the filling opening of the insert element and the outer portion of the mounting element extending outwardly beyond the face of the supporting structure is very small. In such a case it is very difficult to position the outlet end of the injecting arrangement on the filling opening of the insert element. Particularly, it is impossible to properly position an injecting arrangement which is designed for several anchoring operations and which has corresponding large dimensions. It is also impossible to properly position such an arrangement when the filling opening is formed as a longitudinal aperture in the case of a small thickness of the insert element.

SUMMARY OF THE INVENTION

Accordingly, it is an object of the present invention to provide an arrangement for anchoring a mounting element in a hole of a supporting structure by a hardenable binding material, which avoids the disadvantages of the prior art.

More particularly, it is an object of the present invention to provide an arrangement for anchoring a mounting element having an outer portion projecting outwardly beyond the supporting structure, which gives a possibility to properly inject a hardenable binding material into the hole of the supporting structure.

In keeping with these objects and with others which will become apparent hereinafter one feature of the present invention resides, briefly stated, in an arrangement which has a mouthpiece element arranged on a filling opening of an insert element inserted between a mounting element and a wall of a supporting structure, which mouthpiece element has a setting recess located at an acute angle to an axis of the hole of the supporting structure and arranged for receiving an outlet end of the injecting device.

When an anchoring arrangement is constructed in accordance with the present invention, the injecting device can be located in inclined relationship with the mounting element in correspondence with the acute angle of the setting recess. Thereby there is a possibility to inject the hardenable binding material into the hole of the supporting structure even in the case when the distance between the outer portion of the mounting element and the filling opening of the insert element is very small. In the inclined position of the injecting device a tip of the injecting device extends normally in the setting recess of the insert element so that sealing action is guaranteed which prevents lateral leakage of the binding material. An inner passage provided in the mouthpiece element and extending from the setting recess thereof is arranged for aligning with the filling opening of the insert element so that a closed channel is formed which extends from the injecting device up to the hole of the supporting structure, for continuously injecting the binding material into the latter.

In accordance with another feature of the present invention, the mouthpiece element has a sleeve-shaped portion which surrounds and is slidable over the outer portion of the mounting element. The sleeve-shaped portion facilitates positioning of the mouthpiece element onto the filling opening of the insert element, on the one hand, and absorbs the force resulting from the inclined insertion of the injecting device.

A further feature of the present invention is that the arrangement is provided with means for fixing the mouthpiece element on the filling opening of the insert element. This means may be formed by a recess provided in the insert element and a projection provided on the mouthpiece element and engageable into the recess. The fixing means ensures that the mouthpiece element is correctly positioned on and the inner passage of the mouthpiece element is reliably aligned with the filling opening of the insert element during the injecting step.

When a multicomponent adhesive compositions are utilized for anchoring the mounting element, only small gap is formed between the mounting element and the hole of the supporting structure in order to attain high holding characteristics. This makes necessary to provide a corresponding thin-walled insert element for fixing the mounting element in the supporting structure.

In accordance with still a further feature of the present invention, the filling opening of the insert element is formed by a plurality of elongated passages which are located at a circle of a certain diameter, and an injecting passage is provided in a contact surface of the mouthpiece element for communicating the inner passage of the latter with the above-mentioned elongated passages of the insert element. The setting recess may be located either at a distance from the outer portion of the mounting element or at an angle to the longitudinal axis of the latter so that the injecting device can be positioned with its tip or outlet end normal to the setting recess of the mouthpiece element. Distribution of the binding material is performed through the injecting passage which is open into the setting recess and communicates the elongated passages of the insert element with one another.

Since the elongated passages are located concentrically and uniformly distributed over the insert element, outlet opening of a sufficient cross section is thereby formed despite the small wall thickness of the insert element. Since the binding material is uniformly distributed in the elongated passages of the insert element with the aid of the injecting passage of the mouthpiece element, complete filling of the hole of the supporting structure is assured.

In accordance with an additional feature of the present invention the outer surface of the mounting element, or the inner surfaces of the mouthpiece element and the insert element may be provided with ventilating grooves which extend in an axial direction of respective elements.

Finally, in accordance with still an additional feature of the present invention the mouthpiece element and/or the insert element have inner threads arranged for meshing with an outer thread provided on the mounting element. With the aid of the inner thread of the insert element it is possible to adjust the insert element axially in dependence upon the thickness of the objects to be mounted on the mounting element. With the aid of the inner thread of the mouthpiece element firm abutment of the mouthpiece element against the insert element is assured so that lateral displacement of the mouthpiece element relative to the end face of the insert element is prevented even in the event of high injection pressure.

The novel features which are considered as characteristic for the invention are set forth in particular in the appended claims. The invention itself, however, both as its construction and its method of operation, together with additional objects and advantages thereof, will be best understood from the following description of specific embodiments when read in connection with the accompanying drawings.

BRIEF DESCRIPTION OF THE DRAWING

FIG. 1 is a view showing an axial section of an arrangement for anchoring a mounting element in a hole of a supporting structure by a hardenable binding material, in accordance with the present invention;

FIG. 2 is an axial view of the arrangement which is shown in FIG. 1;

FIG. 3 is an axial section of an arrangement for anchoring a mounting element in a hole of a supporting structure by means of an adhesive material; and FIG. 4 is an axial view of the arrangement which is shown in FIG. 3.

DESCRIPTION OF PREFERRED EMBODIMENTS

An arrangement in accordance with the present invention which is utilized for anchoring a mounting element in a hole of a supporting structure is identified in toto by reference numeral 1. The mounting element has an inner portion 2 which is to be anchored in the hole 6 of the supporting structure and is provided with annular grooves 3 for improving its holding ability. The outer surface of the mounting element 1 is spaced from the inner surface of a wall of the hole of the supporting structure so that an inlet opening is formed between these surfaces. An insert element 4 is located in the thus-formed inlet opening and provided with sealing lips 5 which elastically abut against the wall of the hole 6 of the supporting structure. The inlet opening as well as the insert element 4 may have an annular cross section. The insert element 4 firmly fixes the mounting element 1 in the hole 6 of the supporting structure and at the same time prevents backflow of a hardenable binding material injected in the hole 6.

Filling of the hole 6 of the supproting structure by a hardenable bonding material is performed by an injecting arrangement 7 having an injecting nozzle 8. The arrangement in accordance with the invention has a mouthpiece element 10 which is provided with a setting recess 9 extending at an acute angle to an axis of the hole 6 of the supporting structure. For filling of the hole 6 the injecting device 7 is positioned so that its injecting nozzle 8 is located normal to and received into the setting recess 9 of the mouthpiece element 10. Due to the inclined position of the injecting device 7 relative to the longitudinal axis of the mounting element 1, an outer portion 11 of the mounting element 1 which extends outwardly beyond a face of the supporting structure, and the injecting device 7 do not interfere with one another during the injecting step. Thereby proper injection of the binding material into the hole 6 of the supporting structure is possible even in the case when the distance between the mounting element 1 and a filling opening 12 of the insert element 4 is very small.

The setting recess 9 of the mouthpiece element is cup-shaped or spherical, and its diameter corresponds to the diameter of the nozzle tip e.g., the outlet end of the injecting device 7. Such a construction of the setting recess 9 of the mouthpiece element 10 together with the normal position of the injecting device 7 guarantee sealing action which prevents lateral leakage of the binding material. The mouthpiece element 10 has an inner passage 13 which extends from setting recess 9 and is arranged so as to be in alignment with the filling opening 12 of the insert element 4 and to communicate the setting recess 9 with the filling opening 12. Thereby, a closed channel for supplying the binding material from the injecting device 7 into the hole 6 of the supporting structure is formed.

In order to guarantee the alignment of the filling opening 12 of the insert element 4 with the inner passage 13 of the mouthpiece element 10 and to prevent sliding off during the injecting step, the mouthpiece element 10 is provided, on the one hand, with a sleeve-shaped portion 14 which slidably fits over the outer portion 11 of the mounting element 1. Fixing means 15 is provided in the arrangement, on the other hand. The sleeve-shaped portion 14 may also be provided with a jaw-like clamps formed on a section of the sleeve-shaped portion which is located opposite to the inner passage 13 of the mouthpiece element 10.

The above-mentioned fixing means is formed as a recess 16 and a projection 15' engageable into this recess. The projection 15' may be provided, for instance, on the mouthpiece element 10, whereas the recess 15 may be formed in the insert element 4. It is further possible that the inner passage 13 of the mouthpiece element 10 has a thin-walled edge extending into the filling opening 12 of the insert element 4.

FIGS. 3 and 4 shows an arrangement for anchoring the mounting element 1 by means of an adhesive composition. In order to attain optimum binding ability it is necessary in this case that a gap between the mounting element 1 and the wall of the supporting structure be as narrow as possible.

In order to adjust the mounting element 1 in the longitudinal direction the insert element 4 has an inner thread 17 arranged to mesh with an outer thread 16 of the mounting element 1.

The insert element 4 is provided with elongated passages 18 which, together form the filling opening. The mouthpiece element 10 has an injecting passage 19 which is formed in a contact surface of the mouthpiece element 10 and communicates with the setting recess 9 of the latter. The injecting passage 19 is formed as an annular groove and communicates the elongated passages 18 of the insert element 4 with one another. The thus-formed injecting passage 19 ensures distribution of the binding material over the elongated passages 18 of the insert element 4. The elongated longitudinal passages 18 pierce the wall of the insert element 4 and are located concentrically relative to an axis of the latter. Since several such elongated passages are provided, an outlet opening of a sufficient cross section for complete filing of the hole of the supporting structure is thereby formed, despite the small gap between the outer surface of the mounting element 1 and the hole 6 of the supporting structure.

In order to ventilate the hole 6 of the supporting structure the mounting element 1 has a ventilating groove 20 extending from the inner portion 2 of the mounting element 1 in the longitudinal direction of the latter. Ventilating grooves may also be formed in the inner surfaces of the mouthpiece element 10 and the insert element 4. Communication of the ventilating grooves in the case of misalignment is established by a bevel provided in the inner bore of the mouthpiece element 10 and/or the insert element 4.

The mouthpiece element 10 has an inner thread 21 arranged for meshing with the outer thread 16 of the mounting element 1. By screwing the mouthpiece element 10 onto the mounting element 1 firm abutment of the mouthpiece element 10 against the insert element 4 is attained whereby lateral leakage of the binding material is prevented even in the case of high injection pressure.

Means may be provided for preventing backflow of the binding material through the mouthpiece element. Such means may include a cover, a threaded plug and the like, insertable into the setting recess 9 or the inner passage 13 of the mouthpiece element 10.

It will be understood that each of the elements described above, or two or more together, may also find a useful application in other types of constructions differing from the types described above.

While the invention has been illustrated and described as embodied in an arrangement for anchoring a mounting element in a hole of supporting structure by a hardenable binding material it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for anchoring a mounting element in a hole of a supporting structure by a binding material which is supplied into the hole from an outlet end of an injecting device, wherein the mounting element has an outer thread, an outer portion projecting outwardly beyond a face of the supporting structure to mount an object to the latter, and an inner portion located in the hole of the structure to be anchored in the latter and bounding with a wall of the structure an inlet opening, the arrangement comprising an insert element located in said inlet opening and closing the latter, said insert element being provided with a filling opening and having an inner thread arranged for meshing with the outer thread of the mounting element; and a mouthpiece element arranged on said filling opening of said insert element and provided with a setting recess which communicates with said filling opening and is located at an acute angle to an axis of the hole of the supporting structure and arranged for receiving the outlet end of the injecting device.

2. An arrangement as defined in claim 1, wherein said mouthpiece element is also provided with a further inner thread arranged for meshing with the outer thread of the mounting element.

3. An arrangement for anchoring a mounting element in a hole of a supporting structure by a binding material which is supplied into the hole from an outlet end of an injecting device, wherein the mounting element has an outer thread, an outer portion projecting outwardly beyond a face of the supporting structure to mount an object to the latter, and an inner portion located in the hole of the structure to be anchored in the latter and bounding with a wall of the structure an inlet opening, the arrangement comprising an insert element located in said inlet opening and closing the latter, said insert element being provided with a filling opening; and a mouthpiece element arranged on said filling opening of said insert element and provided with a setting recess which communicates with said filling opening and is located at an acute angle to an axis of the hole of the supporting structure and arranged for receiving the outlet end of the injecting device, said mouthpiece being provided with an inner thread arranged for meshing with the outer thread of the mounting element.

4. An arrangement for anchoring a mounting element in a hole of a supporting structure by a binding material which is supplied into the hole from an outlet end of an injecting device, wherein the mounting element has an outer portion projecting outwardly beyond a face of the supporting structure to mount an object to the latter, and an inner portion located in the hole of the structure to be anchored in the latter and bounding with a wall of the structure an inlet opening, the arrangement comprising an insert element located in said inlet opening and closing the latter, said insert element being provided with a filling opening for passing the binding material and with an inner opening for passing the inner portion of the mounting element; and a mouthpiece element on said filling opening, provided with a setting recess located at an acute angle to an axis of the hole of the supporting structure and arranged for receiving the outlet end of the injecting device, said mouthpiece element having a sleeve-shaped portion with a further inner opening for passing the outer portion of the mounting element, so that when the mounting element extends through said inner openings of said insert element and said sleeve-shaped portion of said mouthpiece element inwardly of said elements, the mounting element is fixed relative to the hole of the supporting structure and at the same time the setting recess of the mouthpiece element communicates with said filling opening of said insert element.

5. An arrangement as defined in claim 4, wherein said inner portion of said mounting element has an outer surface and said wall of the supporting structure has an inner surface bounding said hole, said inlet opening being formed between said outer surface of said mounting element and said inner surface of said wall of the supporting structure.

6. An arrangement as defined in claim 5, wherein said inlet opening is annular, said insert element being also annular and having an inner surface abutting against the outer surface of the mounting element and the outer surface abutting against the inner surface of the wall bounding the hole of the supporting structure.

7. An arrangement as defined in claim 6, wherein said insert element is fixedly received in said inlet opening centrally relative to the hole of the supporting structure.

8. An arrangement as defined in claim 4, wherein said mouthpiece element has an inner passage which is open into said setting recess and arranged to communicate with said filling opening of said insert element when the mounting element extends through said inner openings of said insert element and said sleeve-shaped portion of said mouthpiece element.

9. An arrangement as defined in claim 8; and further comprising means for fixing said mouthpiece element to said insert element in a position wherein said inner passage of the former is in alignment with said filling opening of the latter, said fixing means being provided in said mouthpiece element and insert element.

10. An arrangement as defined in claim 9, wherein said fixing means includes at least one fixing recess provided in one of said elements and at least one projection provided on the other element and engageable into said fixing recess of said one element.

11. An arrangement as defined in claim 10, wherein said projection is formed on said mouthpiece element, said fixing recess being formed in said insert element.

12. An arrangement as defined in claim 8, wherein said mouthpiece element has a contact surface abutting against said insert element and is provided with an injecting passage which is arranged on said contact surface and communicates said inner passage of said mouthpiece element with said filling opening of said insert element.

13. An arrangement as defined in claim 12, wherein said filling opening of said insert element is formed by a plurality of elongated passages which are located at a circle having a certain diameter, said injecting passage of said mouthpiece element communicating said elongated passages of said insert element with one another.

14. An arrangement as defined in claim 13, wherein said injecting passage extends in a circumferential direction of said mouthpiece element.

15. An arrangement as defined in claim 4; and further comprising ventilating means for ventilating the hole of the supporting structure and communicating the same with surrounding medium.

16. An arrangement as defined in claim 15, wherein said ventilating means includes at least one groove provided in an outer surface of the mounting element and extending in an axial direction of the latter.

17. An arrangement as defined in claim 15, wherein said ventilating means includes at least one groove provided on the inner surfaces of said mouthpiece element and insert element and extending in an axial direction of these elements.

18. An arrangement as defined in claim 4; and further comprising means for preventing backflow of the hardenable binding material thorugh said mouthpiece element and associable with the latter.

19. An arrangement as defined in claim 18, wherein said preventing means includes a cover.

20. An arrangement as defined in claim 18, wherein said preventing means includes a threaded plug.

* * * * *